US00RE37296E

(19) United States
(12) Reissued Patent
Peterson

(10) Patent Number: US RE37,296 E
(45) Date of Reissued Patent: Jul. 24, 2001

(54) KEYING SYSTEM FOR ELECTRICAL CONNECTORS

(75) Inventor: Bruce A. Peterson, Schaumburg, IL (US)

(73) Assignee: Molex Incorporated, Lisle, IL (US)

(21) Appl. No.: 09/362,904

(22) Filed: Feb. 23, 1999

Related U.S. Patent Documents

Reissue of:
(64) Patent No.: 5,342,221
Issued: Aug. 30, 1994
Appl. No.: 08/139,628
Filed: Oct. 20, 1993

U.S. Applications:
(63) Continuation of application No. 08/001,871, filed on Jan. 8, 1993, now abandoned.

(51) Int. Cl.[7] ..... H01R 13/64
(52) U.S. Cl. ..... 439/677; 439/877
(58) Field of Search ..... 439/675–681, 439/877, 878–882

(56) References Cited

U.S. PATENT DOCUMENTS

| | | | |
|---|---|---|---|
| 3,072,340 | 1/1963 | Dean | 439/701 |
| 4,923,416 | 5/1990 | Zinn | 439/877 |

FOREIGN PATENT DOCUMENTS

| | | |
|---|---|---|
| 0706495 | 5/1941 | (DE) . |
| 4025571 | 11/1990 | (DE) . |
| 0179585 | 4/1986 | (EP) . |
| 0439076 | 7/1991 | (EP) . |
| 0093175 | 4/1991 | (JP) . |

OTHER PUBLICATIONS

Molex Connector Series No. 3191–p. 10K of Molex Catalog No. 910 dated 1991.
Molex Connector Series No. 5025–p.22 K of Molex Catalog No. 910 dated 1991.
Molex Mini–Fit, TPA Connector Series–p. 10K of Molex Catalog No. 910 dated 1991.
Molex Mini–Fit, Jr. Connector Series–p. 6K of Molex Catalog No. 910 dated 1991.
Molex Mini–Fit BMI Connector Series–p. 8K of Molex Catalog No. 910 dated 1991.

*Primary Examiner*—Hien Vu
(74) *Attorney, Agent, or Firm*—Stephen Z. Weiss

(57) ABSTRACT

A keying system is provided for a plurality of electrical connectors having different numbers of terminals. The connectors include at least four sets of mating connectors, such as a male and female connector in each set. Each set of connector is adapted for mounting at least one pair of interengaging terminals, with the numbers of pairs of terminals in any given set of connectors being different from that of any other set of connectors, and with the number of mating terminals in the at least four sets of mating connectors increasing in a predetermined progression. The connectors in each respective set thereof have complementary interengaging mating portions. The respective mating portions of the sets of connectors are constructed such that either connector in any given set thereof cannot mate with a connector of any other set thereof. The mating portions of the connectors are formed by silos and receptacles having generally rectangular cross-sections and arranged in at least one row on their respective connectors. One side of the rectangular silos and receptacles in the row being oriented in a common line along the length of the respective connectors, and flattened corners of the silos and receptacles are located only on an opposite side thereof providing keying means for the connectors.

3 Claims, 4 Drawing Sheets

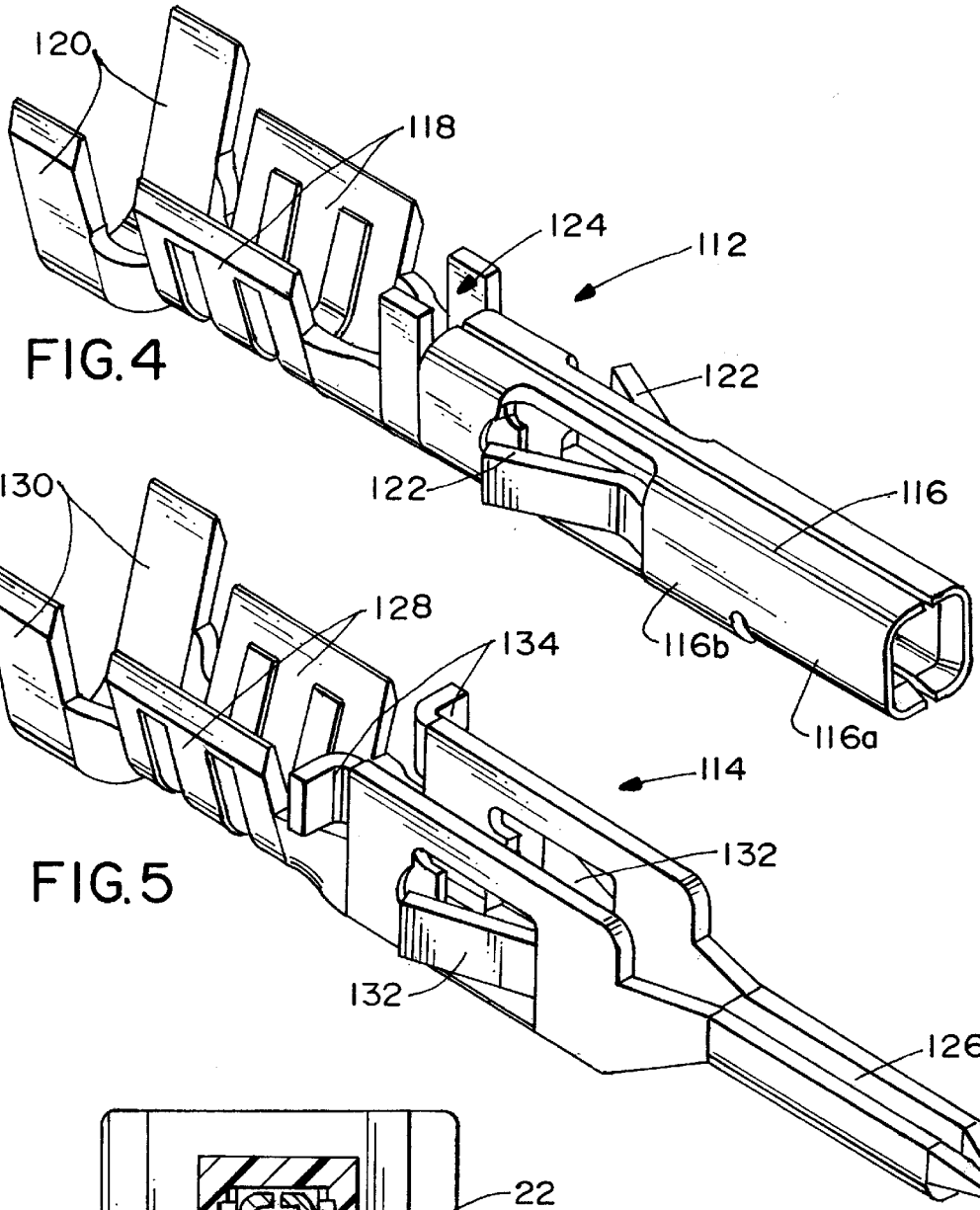
FIG.4
FIG.5
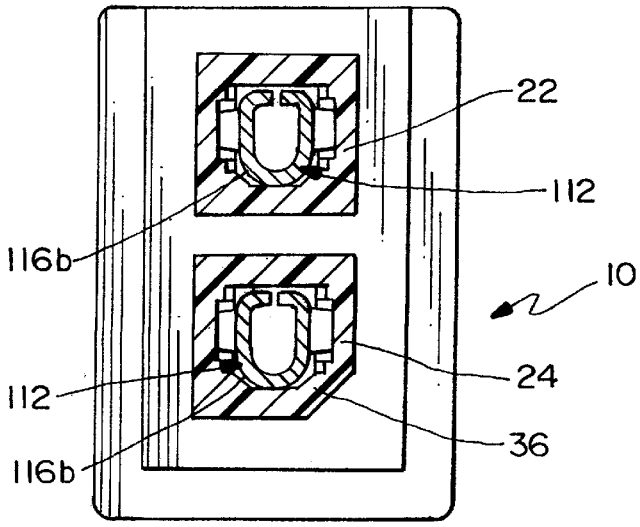
FIG.9

KEYING SYSTEM FOR ELECTRICAL CONNECTORS

Matter enclosed in heavy brackets [ ] appears in the original patent but forms no part of this reissue specification; matter printed in italics indicates the additions made by reissue.

This is a continuation of copending application Ser. No. 08/001,871, filed on Jan. 8, 1993, now abandoned.

FIELD OF THE INVENTION

This invention generally relates to the art of electrical connectors and, particularly, to a keying system for a plurality of electrical connectors having different numbers of terminals.

BACKGROUND OF THE INVENTION

Electrical connectors are provided in a wide variety of configurations and generally are provided in sets (i.e. pairs) of connectors, such as male and female connectors, which are used to interconnect terminating ends of electrical circuitry. The connectors mount a plurality of terminals or contacts which interengage when the connectors are mated. Most often, the terminals or contacts are terminated to discrete wires or to circuit traces on a printed circuit board and which must be properly interconnected. For instance, in hard wired circuitry, a "hot" wire must be interconnected with a corresponding hot wire, a neutral wire must be interconnected with a corresponding neutral wire and a ground wire must be interconnected with a corresponding ground wire. In certain electronic applications, various signal circuitry must be properly interconnected with corresponding signal circuitry through the mating connectors. Consequently, it has been common to polarize a set or pair of mating electrical connectors so that they can be mated in only one orientation in order to properly polarize the electrical wiring or circuitry therethrough.

In order to properly understand the invention herein, the term "polarization" is understood to define structures whereby a single set or pair of electrical connectors can be mated in only one orientation as described above, such as in only one of two 180° orientations. The term "keying", on the other hand, is meant to describe a system wherein one connector of any given set or pair thereof cannot be mated with another connector of another set or pair thereof, regardless of orientation.

Heretofore, there have been a variety of different polarization schemes or structures. For instance, a set or pair of electrical connectors may have keys and slots or other shapes on the outside surfaces of the connectors so that the connectors can be polarized and mated in only one of two 180° orientations. Another scheme utilizes silos projecting from a connector housing and within which the terminals or contacts are mounted. The silos are received in receptacles of the mating connector. The silos and receptacles have a particular cross-sectional shape which allow the connectors to mate in only one of two 180° orientations.

However, there are electrical connector systems wherein a plurality of sets or pairs of mating electrical connectors are provided of similar configurations, such as generally rectangular configurations, and wherein each set of connectors mounts a different number of pairs of terminals or contacts. In such systems, although the connectors in any given set thereof are polarized in order to ensure proper mating, there is a danger that one connector of any given set will be mated with a connector of a different set. In other words, one set or pair of mating connectors may have only one pair of terminals or contacts. That set of connectors would interconnect two circuits. Another set of mating connectors may have two pairs of terminals for interconnecting four circuits. The sets of connectors may increase in "size" to include three pairs of terminals for interconnecting six circuits, four pairs of terminals for interconnecting eight circuits, and so on. In other words, the size of the connectors are determined by the number of interconnected circuits, and such connectors are manufactured, sold and/or made available in the connector industry as an identifiable "Series" or "Line" of electrical connectors. There is a need for providing a keying system for such electrical connector systems whereby a connector in any given set thereof cannot be mated with an opposite connector in any other set thereof having a larger number of pairs of terminals. In other words, there could be serious problems if a smaller sized connector would be connected inadvertently or erroneously to a larger sized connector.

Problems are encountered in attempting to employing keying schemes to electrical connector systems described immediately above, particularly wherein the plurality of sets of connectors in the electrical connector system employ silos and receptacles at the mating interface between the connectors in each set. These problems arise particularly in high density and/or miniaturized electrical connectors wherein the terminals are very closely spaced in a compact array. It is difficult to provide keying structures on the silos and/or in the receptacles because the walls thereof are very thin when using particular configurations of terminals. This invention also is directed to solving those problems by providing a unique keying system for sets of electrical connectors which use silos and receptacles at their mating interfaces.

This invention is directed to solving such problems and satisfying the need for such a keying system.

SUMMARY OF THE INVENTION

An object, therefore, of the invention is to provide a new and improved keying system for a plurality of electrical connectors having different numbers of terminals.

Generally, the keying system of the invention is designed for use with at least four sets or pairs of mating connectors, such as with a male and female connector in each set. In the exemplary embodiment of the invention, the connectors have generally similar rectangular elongated configurations. Each set of connectors is adapted for mounting at least one pair of interengaging terminals, with the numbers of pairs of terminals in any given set of connectors being different from that of any other set of connectors, and with the number of mating terminals in the at least four sets of mating connectors increasing in a predetermined progression. The connectors in each respective set thereof have complementary interengaging mating portions. The invention contemplates that the respective mating portions of the sets of connectors be constructed so that either connector in any given set thereof cannot mate with a connector of any other set of connectors.

In the exemplary embodiment of the invention, the sets of connectors are adapted for mounting the pairs of interengaging terminals arranged in at least one row on their respective connectors whereby the connectors have increasing lengths as a function of the number of pairs of terminals on the respective connectors. The terminals are mounted within projecting silos in one of the connectors in each set thereof, and the other connector in each respective set includes receptacles for receiving the silos. The complementary interengaging mating portions of the connectors, therefore, are provided by the silos and receptacles. In one form of the invention, the silos and receptacles are orthogonal in cross-section with flattened sides at different locations to prevent either connector in any given set thereof from mating with a connector of any other set thereof. As disclosed herein, the orthogonal silos and receptacles are generally rectangular or square with flattened corners thereof defining the flattened sides.

In particular, in the disclosed embodiments of the invention, the generally rectangular or square silos and receptacles are arranged in at least one row on their respective connectors, and it is contemplated that one side of the rectangular silos and receptacles be oriented in a common line along the length of the respective connectors. The flattened corners are located only on an opposite side of the rectangular silos and receptacles.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4 is a perspective view of a socket-type terminal as may be mounted within either of the male connectors shown in FIGS. 1 and 2;

FIG. 5 is a perspective view of a pin-type terminal as may be mounted within either of the female connectors shown in FIGS. 1 and 2;

FIG. 9 is a section taken generally along line 9—9 of FIG. 6.

DETAILED DESCRIPTION OF THE PREFERRED EMBODIMENT

Figure 1:
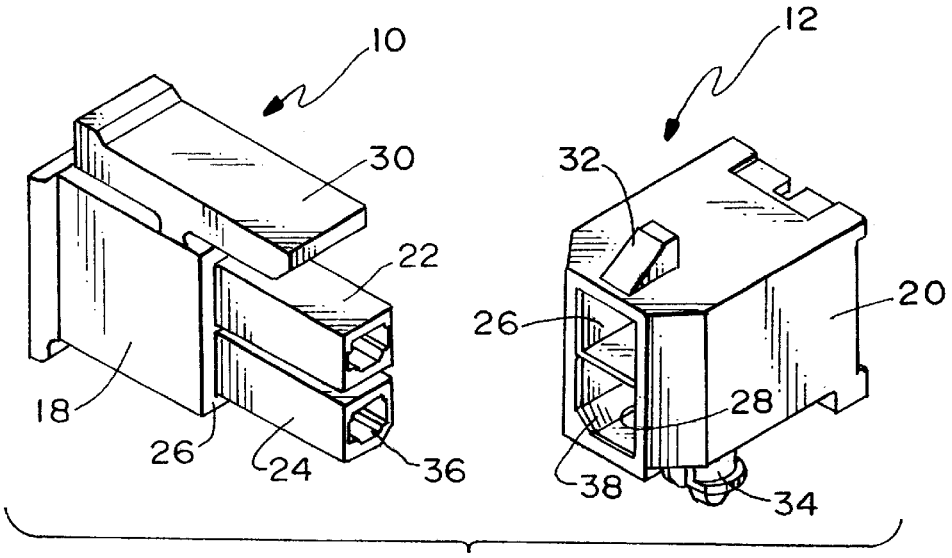
FIG. 1 is a perspective view of a set or pair of mating electrical connectors embodying the concepts of the invention and adapted for mounting a single pair of terminals or contacts.
Figure 2:
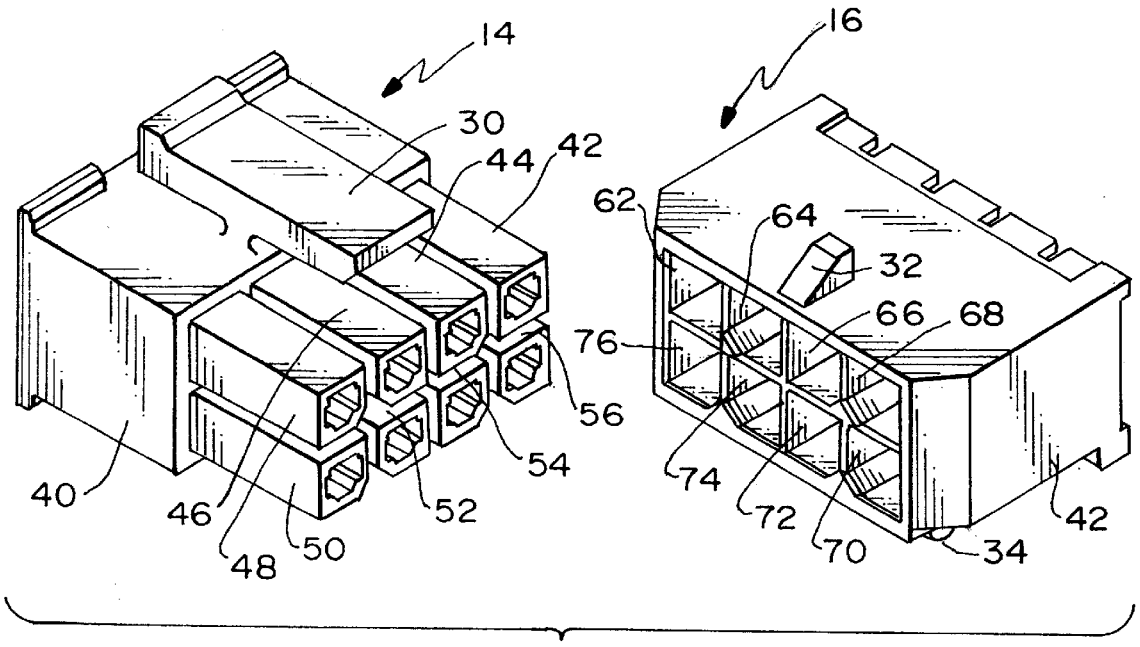
FIG. 2 is a perspective view of a set or pair of mating connectors adapted for mounting four pairs of terminals.

Referring to the drawings in greater detail, the invention is directed to a keying system for a plurality of electrical connectors having different numbers of terminals. Therefore, FIG. 1 shows a set or pair of electrical connectors, generally designated 10 and 12, which are adapted for mounting one pair of terminals or contacts. FIG. 2 shows another set or pair of electrical connectors, generally designated 14 and 16, which are adapted for mounting four pairs of terminals or contacts.

Referring specifically to FIG. 1, connector 10 can be considered a male connector and connector 12 can be considered a female connector. Connector 10 includes a dielectric housing 18 and connector 12 includes a dielectric housing 20, both housings being adapted for mounting a single pair of terminals or contacts. Connector 10 includes a pair of silos 22 and 24 projecting from a mating face 26 thereof for insertion into a pair of receptacles 26 and 28, respectively, of connector 12. When the connectors are fully mated by inserting silos 22 and 24 respectively into receptacles 26 and 28, appropriate latch means, including a resilient latch arm 30 on connector 10 and a chamfered latch boss 32 on connector 12, may be used for latching the connectors in mating condition. Connector 12 is shown to include a mounting post 34 for surface mounting the connector to a printed circuit board. Up to this point, the general construction of such electrical connectors as connectors 10 and 12 is generally known, such as in Molex® Series 3191 and 5219 electrical connectors.

Still referring to FIG. 1, it can be seen that silos 22 and 24 are generally rectangular (square, as illustrated) in cross-section and receptacles 26 and 28 have corresponding rectangular configurations. However, it should be noted that silo 22 and receptacle 26 are pure four-sided configurations, whereas the configurations of silo 24 and receptacle 28 are flattened at their corners, as at 36 for silo 24 and as at 38 for receptacle 28. By flattening the corners of one of the mating silos and receptacles, a polarization means is provided so that connectors 10 and 12 can be mated only in the orientation shown in FIG. 1. If either of the connectors are inverted 180°, square silo 22 cannot be inserted into receptacle 28 which has one of its corners flattened as at 38.

Referring to FIG. 2, mating connectors 14 and 16 are constructed similar to connectors 10 and 12, except that connectors 14 and 16 are adapted for mounting a different number of pairs of terminals. Specifically, connector 14 has a dielectric housing 40 and connector 16 has a dielectric housing 42 for mounting four pairs of terminals therein. The connectors also have the latch means 30 and 32 for holding the connectors in mated condition. Still further, the connectors have a similar rectangular configuration as connectors 10 and 12 in FIG. 1. Specifically, the width or height of connectors 14 and 16 in FIG. 2 is the same as that of connectors 10 and 12 in FIG. 1. The lengths of the connectors are a function of the number of pairs of terminals which the connectors are adapted to mount. Therefore, connectors 14 and 16 are approximately four times the lengths of connectors 10 and 12.

Like connectors 10 and 12 in FIG. 1, connectors 14 and 16 in FIG. 2 are constructed such that connector 14 has a plurality of silos 42–56 for insertion into receptacles 62–76, respectively, in connector 16. In other words, silo 42 is insertable into receptacle 62, silo 44 is insertable into receptacle 64, silo 46 is insertable into receptacle 66, and so on such that silo 56 is insertable into receptacle 76.

The keying system of the invention as applied to connectors 14 and 16 in FIG. 2 utilizes the concept of flattening different corners of the rectangular or square configurations of silos 42–56 and receptacles 62–76 so that not only are connectors 14 and 16 polarized relative to each other, as described in relation to connectors 10 and 12 in FIG. 1, but connectors 10 and 12 cannot be mated with connectors 14 and 16 even though connectors 10 and 12 have only one pair of silo/receptacle constructions and connectors 14 and 16 have four pairs of silo/receptacle constructions.

More particularly, silo 42 of connector 14 has a pure four-sided configuration in cross-section. Silos 44, 48, 50 and 54 all are flattened at their bottom right-hand corners as viewed in FIG. 2. Silos 46, 52 and 56 are flattened at their bottom left-hand corners. Comparing these configurations of the cross-sectional shapes of silos 42–56, it can be seen that receptacles 62–76 are correspondingly configured in a total array to match the configurations of the silos when the connectors are properly mated in the orientation shown in FIG. 2. In other words, receptacle 62 is configured to match the configuration of silo 42, receptacle 64 is configured to match the configuration of silo 44, and so on through the array until receptacle 76 is configured to match the configuration of silo 56.

However, now a comparison should be made between the configurations of silos 22 and 24 of connector 10 and receptacles 26 and 28 of connector 12 in FIG. 1, with the above-described configurations of silos 42–56 and receptacles 62–76 of connectors 14 and 16 in FIG. 2. It can be seen that there are no two pairs of vertically oriented receptacles in connector 16 which are configured such that silos 22 and 24 of connector 10 can be inserted thereinto. The only receptacle in connector 16 which has a pure four-sided configuration is receptacle 62 which could receive silo 22 of connector 10. However, it should be noted that the immediately subjacent receptacle 76 of connector 16 has a flattened corner at a different location than that of silo 24 of connector 10. Therefore, connector 10 cannot be inserted into connector 16 by attempting to insert silos 22 and 24 into the pair of receptacles 62 and 76. Proceeding along the length of connector 16, it can be seen that all of the other receptacles have at least one corner flattened. Silo 22 of connector 10, consequently, cannot be inserted into any of the other remaining pairs of receptacles in connector 16. Therefore, it is impossible to mate connector 10 (FIG. 1) with connector 16 (FIG. 2) or to mate connector 14 (FIG. 2) with connector 12 (FIG. 1) regardless of any possible orientation of the respective connectors.

Figure 3:
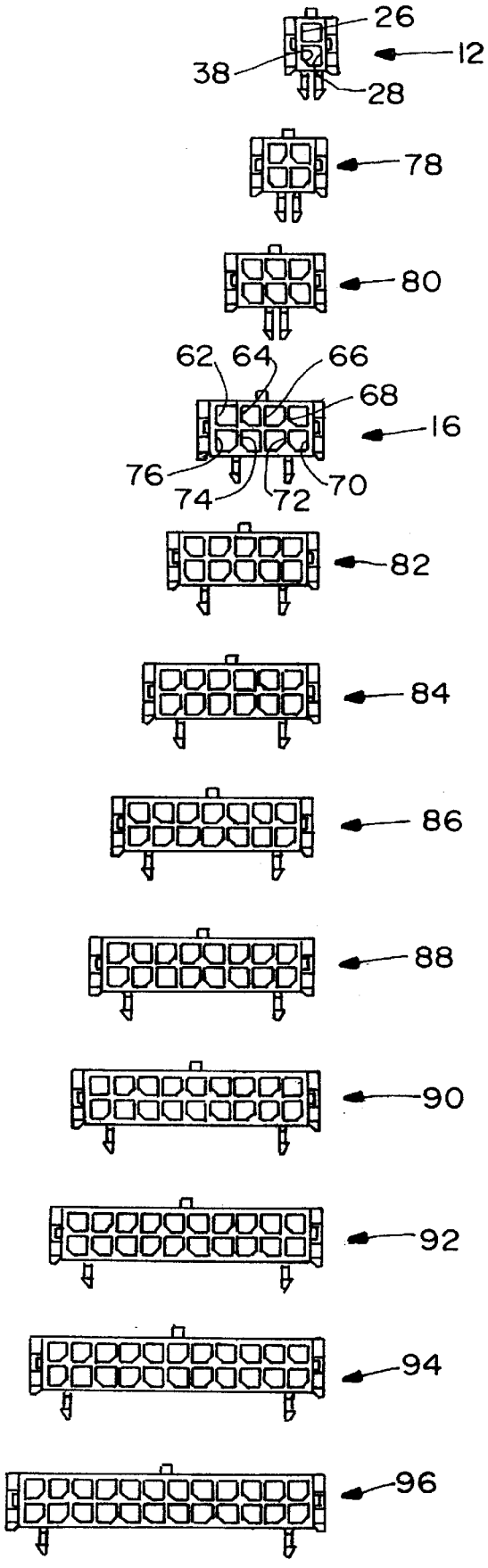
FIG. 3 is a somewhat schematic illustration showing the front faces of twelve electrical connectors from twelve different sets thereof and respectively adapted for mounting from one pair to twelve pairs of terminals.

With the above-described keying system of the invention in relation to connectors 10 and 12 in FIG. 1 which are adapted for mounting only one pair of terminals, and connectors 14 and 16 in FIG. 2 which are adapted to mount four pairs of terminals, reference now is made to FIG. 3 in order to illustrate how the keying system of the invention can be expanded to a considerable number of sets or pairs of mating connectors. In order to concisely set forth the invention, FIG. 3 shows a plurality of connectors which correspond to receptacle or female connectors 12 and 16, it being understood that for each connector shown in FIG. 3, there will be a corresponding mating male connector such as connectors 10 and 14.

Specifically, connector 12 (FIG. 1) is shown in FIG. 3, as is connector 16 (FIG. 2). However, additional connectors are shown in FIG. 3 as being adapted for mounting different numbers of pairs of terminals. A connector 78 is adapted for mounting two pairs of terminals. A connector 80 is adapted for mounting three pairs of terminals. A connector 82 is adapted for mounting five pairs of terminals. A connector 84 is adapted for mounting six pairs of terminals. A connector 86 is adapted for mounting seven pairs of terminals. A connector 88 is adapted for mounting eight pairs of terminals. A connector 90 is adapted for mounting nine pairs of terminals. A connector 92 is adapted for mounting ten pairs of terminals. A connector 94 is adapted for mounting eleven pairs of terminals. A connector 96 is adapted for mounting twelve pairs of terminals. This series of electrical connector illustrations can be expanded further but will not be done herein so as not to clutter the drawings. As described above, all of connectors 12, 16 and 78–96 have generally the same widths or heights. The lengths of the connectors are a function of the numbers of pairs of terminals for which the connectors are adapted to mount. In other words, connector 96 is approximately twelve times the length of connector 12, excluding the end walls of the connector housings.

Still referring to FIG. 3, it can be seen that connector 12 is shown to include its single pair of receptacles 26 and 28, with one corner of receptacle 28 flattened as at 38, as described above in relation to FIG. 1. Likewise, connector 16 is shown to include its array of four pairs of receptacles 62–76 with seven of the eight receptacles having flattened corners as described above in relation to FIG. 2. So as not to unduly clutter the illustration of FIG. 3, reference numbers have not been applied to all of the receptacles of connectors 78, 80 and 82–96. However, by comparing all of connectors 12–96, it is apparent that no connector of a lesser number of terminals can be mated with a corresponding male connector of a larger number of pairs of terminals, assuming that each of female or receptacle connectors 12–96 mate with male connectors having silo configurations matching the receptacle configurations of the respective connectors. For example, connector 10 (FIG. 1) with its single pair of silos 22 and 24, cannot be mated with any of female or receptacle connectors 78–96. Likewise, connector 14 with its array of particularly configured silos 42–56, cannot be mated with any of connectors 82–96. The same scheme is effective to prevent connector 78 from mating with a corresponding male connector which is mateable with any of connectors 16 or 80–96 which are adapted for mounting a larger number of pairs of terminals. Continuing on, a male connector which is mateable with connector 82 (FIG. 3) cannot mate with any of connectors 84–96. The same scheme is true for any other connectors in the increasing series shown in FIG. 3.

FIGS. 4 and 5 show a socket-type terminal, generally designated 112 (FIG. 4), and a pin-type terminal, generally designated 114 (FIG. 5), for mounting within the connectors described above in relation to FIGS. 1–3, and as will be described in greater detail hereinafter.

More particularly, socket terminal 112 (FIG. 4) includes a socket 116 at a mating end of the terminal, and two pairs of crimp arms 118 and 120 at a terminating end of the terminal. Socket 116 includes a generally rectangular outer end portion 116a for receiving a pin portion of terminal 114 (FIG. 5), as described hereinafter, and crimp arms 118 and 120 are configured for terminating to an electrical wire or cable, all of which is generally conventional. Terminal 112 is stamped and formed of sheet metal material and includes a pair of locking tabs 122 projecting outwardly from socket 116, along with a stabilizing portion 124, for facilitating securement of the terminal within its respective connector housing. Socket 116 has an inner portion 116b which is enlarged in relation to outer end portion 116a in order to accommodate locking tabs 122. In a sectional view (as will be apparent hereinafter in relation to FIG. 9), the overall cross-sectional configuration or profile of inner portion 116b of socket 116 is generally U-shaped.

Pin terminal 114 (FIG. 5) is similarly shaped in comparison to socket terminal 112 (FIG. 4) in that it includes a mating end defined by a pin 126 and a terminating end defined by two pairs of crimp arms 128 and 130. Again, the crimp arms are configured for termination to an electrical wire or cable, and pin 126 is configured for insertion into socket 116 of socket terminal 112 shown in FIG. 4. Like terminal 112, terminal 114 is stamped and formed of sheet metal material and includes a pair of locking tabs 132 projecting outwardly therefrom for facilitating securement of the terminal within its respective connector housing. A pair of positioning flanges 134 project outwardly from the terminal for locating the terminal within the connector housing.

Figure 6:
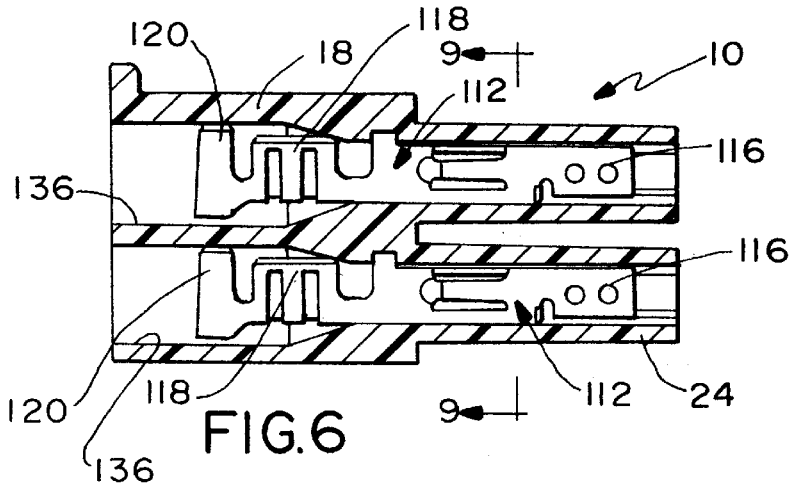
FIG. 6 is a front-to—rear vertical section through one of the male connectors shown in FIGS. 1 and 2, with socket-type terminals of FIG. 4 mounted therewithin.

FIG. 6 shows a connector mounting a pair of socket terminals 112, such as a front-to-rear section through male connector 10 shown in FIG. 1 which, as described above, includes a dielectric housing 18 with a pair of forwardly projecting silos 22 and 24. It can be seen that sockets 116 of terminals 112 are located within silos 22 and 24, while terminating crimp arms 118 and 120 are located within cavities 136 at the rear of housing 18 and through which appropriate electrical wires or cables (not shown) extend for termination to the terminals.

Figure 7:
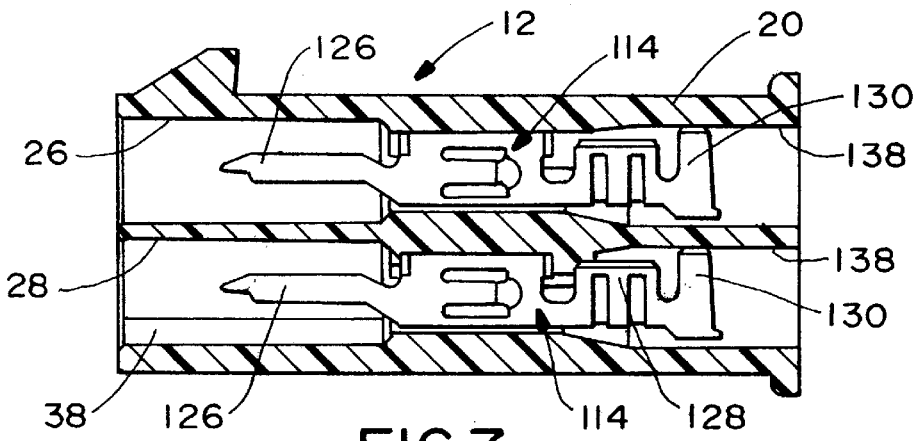
FIG. 7 is a front-to-rear vertical section through one of the female connectors shown in FIGS. 1 and 2, with pin-type terminals of FIG. 5 mounted therewithin.

FIG. 7 shows a front-to-rear section through either female connector 12 (FIG. 1) or female connector 16 (FIG. 2), illustrating a pair of pin terminals 114 (FIG. 5) mounted therewithin. For simplicity and clarity purposes, female connector 12 will be described, with housing 20 and receptacles 26 and 28 into which silos 22 and 24 of male connector 10 (FIG. 6) are insertable. It can be seen that each terminal 14 has its mating pin 126 located generally centrally of the respective receptacle for mating in sockets 116 (FIG. 6) of socket terminals 112. It can be seen that, like socket terminals 112, crimp arms 128 and 130 of pin terminals 114 are located in cavities 138 at the rear of housing 20 and through which appropriate electrical wires or cables (not shown) extend for termination to the terminals.

Figure 8:
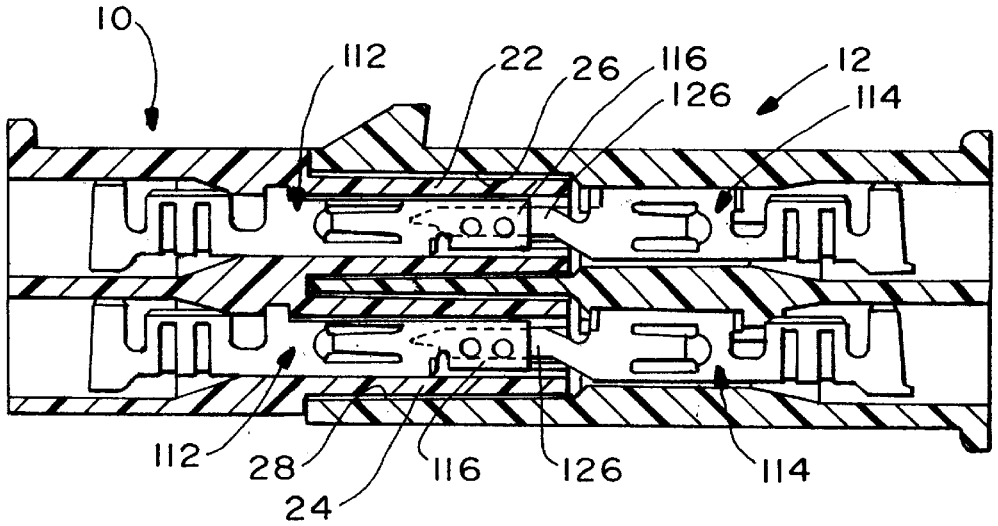
FIG. 8 is a front-to—rear vertical section of the connectors of FIGS. 6 and 7 in mated condition.

FIG. 8 simply shows connectors 10 and 12 of FIGS. 6 and 7 in mated condition. It can be seen that silos 22 and 24 of connector 10 have been inserted within receptacles 26 and 28, respectively, of connector 12. Pins 126 of terminals 114 also can be seen inserted into receptacles 116 of terminals 112.

FIG. 9 shows a sectional view through silos 22 and 24 of male connector 10 (FIG. 6) to show the general U-shaped transverse configurations or profiles of inner portions 116b of socket 116. With the U-shaped transverse profiles of these portions of the terminals, it can be seen that the top corners of the terminal profiles are located close to the corners of the respective silos. Consequently, it would be very difficult to key the silo/terminal configurations by flattening the upper corners thereof. However, with the U-shaped profiles of the terminals, it can be seen that flattened corner 36 for silo 24 easily can be molded into the connector housing structure without any interference by the terminals or to accommodate the profiles of the terminals. Ample wall thicknesses are thereby affordable, completely surrounding the terminals, whereas this would not be possible by flattening the upper corners of the silo configurations.

With the above understanding in relation to FIG. 9, reference now is made back to FIGS. 2–3 wherein it can be seen that the silo/receptacle structures are arranged in at least one row (FIG. 3) along the length of the elongated connectors, two rows of silo/receptacle structures being provided on the connectors in FIG. 2. It should be noted that the top sides of the silo/receptacle structures all are oriented in a common line along the length of the respective connectors. It also should be noted that the flattened keying corners of some of the silo/receptacle structures are located only on the opposite sides of the structures, i.e. on the sides of the structures opposite the common line defined by the top sides of the structures. With such a keying system, all of the terminals are mounted in their respective silo/receptacle structures in the same orientation as shown in FIGS. 4–9.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A keying system for a plurality of electrical connectors having different numbers of terminals, comprising:

a plurality of male connectors each having an elongate housing with a plurality of silos projecting from the housing in only two parallel rows longitudinally of the housing, the silos of first and second rows of said parallel rows, each having generally rectangular cross-sections defining opposite first and second sides running longitudinally along the housing, the first sides of the silos of each row being in a common line generally parallel to said rows, and a plurality of terminals mounted within the housing of said male connectors with contact portions of the terminals projecting into the silos;

a plurality of female connectors each having an elongate housing with a plurality of receptacles in only two rows for mating with the silos of the male connectors, the receptacles of first and second rows having generally rectangular cross-sections defining opposite first and second sides running longitudinally along the housing, the first sides of the receptacles of each row being in a common line generally parallel to said rows, and a plurality of terminals mounted in the housing of said female connectors with contact portions located in the receptacles for mating with the terminals of the male connectors;

said mating male and female connectors being provided in sets of connectors with a male and female connector in each set, there being at least four sets of said mating connectors, each set of said connectors being adapted for mounting at least two pairs of mating terminals, with number of mating terminals in any given set of connectors being different from the number of any other set of connectors, and the number of mating terminals in the at least four sets of mating connectors increasing in a predetermined progression such that the connectors have increasing lengths as a function of the number of mating terminals on the respective connectors; and at least some of said silos of the male connectors and said receptacles of the female connectors including flattened corners only on said second sides thereof such that either connector in any given said set of connectors cannot mate with a connector of any other set thereof, *and wherein any given receptacle and its mating silo of any given said set of mating connectors having only one flattened corner on the second side thereof.*

2. The keying system of claim 1 wherein at least sections of the contact portions of the terminals which project into said silos have generally U-shaped transverse profiles defining generally rounded bottoms of the terminals adjacent the second sides of the silos.

[3. The keying system of claim 1 wherein any given receptacle and its mating silo of any given said set of mating connectors has only one flattened corner on the second side thereof.]

4. The keying system of claim 1 wherein one set of mating connectors is adapted for mounting at least twenty-four pairs of mating terminals.

* * * * *